No. 834,362.

PATENTED OCT. 30, 1906.

A. W. CRAM.
PIPE CONNECTION.
APPLICATION FILED FEB. 4, 1905.

Witnesses
Inventor
A. W. Cram,
By A. S. Pattison
Attorney

UNITED STATES PATENT OFFICE.

ALONZO W. CRAM, OF HAVERHILL, MASSACHUSETTS.

PIPE CONNECTION.

No. 834,362.  Specification of Letters Patent.  Patented Oct. 30, 1906.

Application filed February 4, 1905. Serial No. 244,129.

*To all whom it may concern:*

Be it known that I, ALONZO W. CRAM, a citizen of the United States, residing at Haverhill, in the county of Essex and State of Massachusetts, have invented new and useful Improvements in Pipe Connections, of which the following is a specification.

My invention relates to improvements in pipe connections, and pertains to a connection so constructed that the adjacent ends of the pipes telescope and one pipe adapted to be arranged at an angle to the other pipe through the medium of diagonally-arranged seats.

The object of my invention is to provide the adjacent ends of pipes with diagonally-arranged seats, whereby the pipes may be relatively arranged in direct lines or at various angles to each other simply by turning one pipe in relation to the other and at the same time preserve an absolutely smooth continuous inner surface which will not collect any sediment or other refuse matter.

Another object of my invention is to provide the ends of the pipes with globular or conical-shaped sockets provided with teeth and having their upper ends drawn inwardly for increasing the tensile strength of the pipe and for retaining the packing therein.

Figure 1:
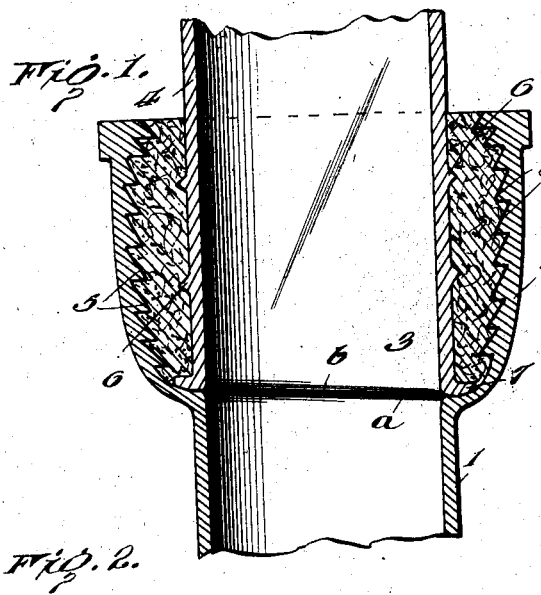
Figure 2:
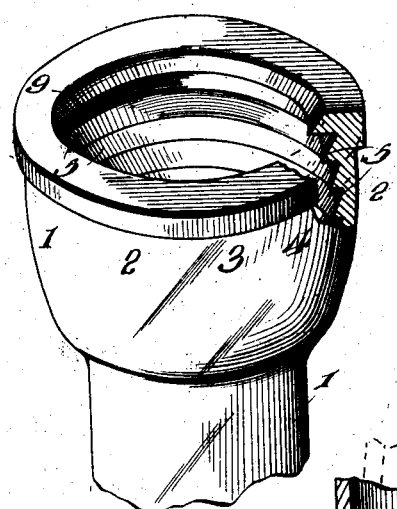
Figure 3:
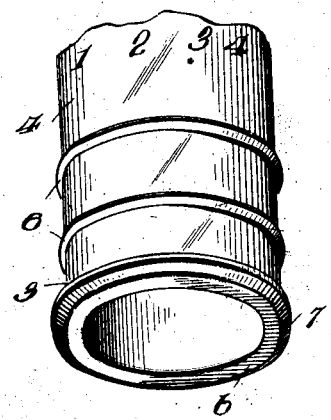
Figure 4:
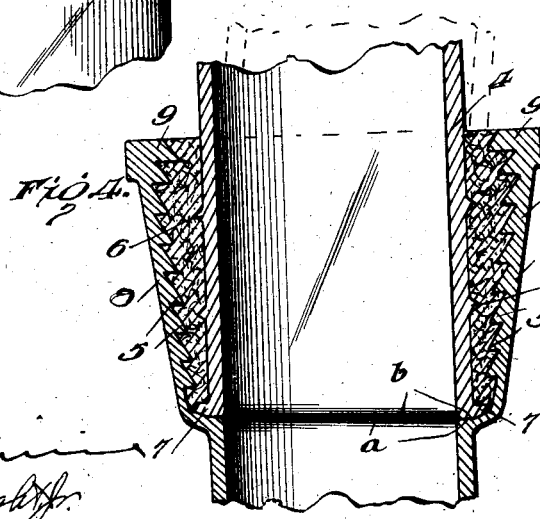

In the accompanying drawings, Figure 1 is a central longitudinal sectional view of a pipe connection embodying one form of my invention. Fig. 2 is a detached perspective view of the end of the pipe containing the receiving-socket. Fig. 3 is a perspective view of the opposite end of the pipe. Fig. 4 is a view showing a modification in respect to the construction of the receiving-socket formed at one end of the pipe.

Referring now to the drawings, 1 indicates a pipe which is provided at one end with an expanded or enlarged receiving-socket 2 and which is adapted to receive a relatively smaller end 3 of an adjacent pipe 4.

As shown in Figs. 1, 2, and 3, the receiving-socket I prefer to form of a globular shape in which the outer edge is drawn inward, which greatly increases the tensile strength of the pipe and also assists materially in permanently and firmly holding the ends of the pipes together by means of packing to be inserted around the ends of the pipes and within the receiving-socket. The pipe 1 at the inner end of the socket 2 is provided with a diagonally-arranged seat *a*, and the pipe 4 has its end 3 provided with a correspondingly diagonally-arranged seat *b*.

In Fig. 4 instead of making the socket globular in form I make it of a conical shape—that is, with the straight outwardly-flared walls 8, which have their upper ends drawn inwardly at 9—and the inner faces of said socket are provided with teeth 5, corresponding with the teeth 5 in the other figures of the drawings and is for the purpose of holding the packing therein.

From the foregoing description and on account of the diagonally-arranged engaging seats *a* and *b* it will be understood that when the pipes 1 and 4 are in the position shown in Fig. 1 the pipes will be in a direct straight line one with the other. If, however, the pipe 4 is turned slightly, it will extend at an angle to the pipe 1 corresponding to the distance it has been turned and depending upon the pitch of the diagonal seats *a* and *b*. The socket 2 is sufficiently larger than the end 3 of the pipe 4 to permit the pipe 4 to extend at an angle to the pipe 1, and this angle will vary according to the distance the pipe 4 is rotated in respect to the pipe 1 and upon the pitch of the diagonally-arranged engaging seats *a* and *b*. As here shown, the said engaging seats of the pipes 1 and 4 are preferably conical, whereby a tighter fit and a more perfect fit is provided, and whereby the pipe 4 is caused to absolutely center itself in respect to the pipe 1 when its end is placed therein and the seats *a* and *b* brought in contact. This arrangement of the pipes will provide an absolutely smooth unbroken inner continuous surface when the two pipes are placed together, thus preventing the accumulation of any sediment or refuse, and thus serving to materially prevent the clogging or stopping up of a line of pipes. This continuous unbroken surface in the construction here shown is provided whether the pipes extend in a direct line or whether they extend at an angle to each other.

For the purpose of enabling the two pipes to be placed directly in a line with each other or at any predetermined angle and enable the workman to determine the angle accurately I provide the socket end of the pipe 1 at its outer end with designating characters—such, for instance, as "1, 2, 3, 4," &c., dividing the circumference of the socket into as many sections or parts as may be desirable; and I provide the outer surface of the end 3 of the pipe 4 with similarly-arranged numerals about opposite the numerals on the socket for the same purpose. As the pipes are placed together with the numerals adjacent each other they will then be in a direct straight line. When the designating characters are turned out of line with each other in either direction, then the pipe 4 will extend at an angle to the pipe 1, corresponding to the distance the pipes are turned, and this distance can be determined by the indicating characters, as will be readily understood.

Preferably the inner face of the socket 2 is provided with the teeth 5 for the purpose of holding any desired calking material between the said seat, and the outer surface of the pipe 4 and the end 3 of the pipe 4 may be provided with one or more circumferentially-arranged rings or beads 6 for the purpose of strengthening the pipe and also for the purpose of assisting in holding the two ends of the pipes together through the medium of the calking. Also at the extreme end of the pipe 4 is provided a circumferential shoulder 7 for the purpose of widening out the conical engaging seats and also serving as a shoulder against which the calking material will abut and directly serve to hold the two seats of the pipe in engagement.

It will of course be understood that the pipe 4 and the pipe 1 are constructed exactly alike—that is to say, the opposite end of the pipe 1 from the socket 2 will be constructed like the end 3 of the pipe 4, and the opposite end of the pipe 4 will be provided with a socket 2, whereby the pipes are adapted to receive adjacent ends and to construct a continuous line of pipes when so desired.

It will be understood that my invention includes the use of sheet metal, wrought-iron, or cast-iron pipes, the material of which the pipes are constructed being wholly immaterial so far as the invention here described is concerned and may be varied without departing from or affecting in any manner my invention.

Having thus described my invention, what I claim, and desire to secure by Letters Patent, is—

1. A pipe-coupling, comprising two pipes having adjacent telescoping ends provided with diagonally-arranged engaging seats, the outer telescoping end being sufficiently large to permit a relative turning and lateral movement.

2. A pipe-coupling, comprising two pipes, the adjacent ends of one pipe having a socket receiving the adjacent end of the other pipe, the socket and the adjacent end of the pipe received thereby having corresponding diagonally-arranged seats, said socket being sufficiently large to permit a relative turning and lateral movement therein of the end of the pipe received thereby.

3. A pipe-coupling, comprising two pipes, the adjacent end of one pipe having a socket receiving the adjacent end of the other pipe, the inner end of the socket and the adjacent end of the pipe received thereby, having corresponding diagonally-arranged seats, said socket being sufficiently large to permit a relative turning and lateral movement therein of the end of the pipe received thereby, the socket and pipe received thereby adapted to be held together by suitable calking.

4. A pipe-coupling comprising two pipes, the adjacent end of one pipe having a socket receiving the adjacent end of the other pipe, the socket and adjacent end of the pipe having corresponding diagonally-arranged seats, said socket being sufficiently large to permit a relative turning and lateral movement therein of the end of the pipe received thereby, and the outside of the pipe and socket being provided with corresponding numerals to determine their relative positions.

5. A pipe-coupling, comprising two pipes, the adjacent end of one pipe having an outwardly-flared conical socket having the outer end drawn inward and adapted to receive the adjacent end of the other pipe, the socket and adjacent end of the pipe having corresponding diagonally-arranged seats, said socket being sufficiently large to permit a relative turning and lateral movement therein of the pipe received thereby, and the outside of the pipe and socket being provided with corresponding numerals to determine their relative positions.

6. A pipe-coupling, comprising two pipes, the adjacent end of one pipe having a socket receiving the adjacent end of the other pipe, the socket and the adjacent end of the pipe received thereby having corresponding diagonally-arranged seats, said socket being sufficiently large to permit a relative turning and lateral movement therein of the end of the pipe received thereby, the end of the socket having numerals corresponding to numerals carried by the side of the pipe.

In testimony whereof I have hereunto set my hand in the presence of two subscribing witnesses.

ALONZO W. CRAM.

Witnesses:
CHARLES J. HALPEN,
WILLIAM D. CRAM.